United States Patent
Alvarez Gonzalez

(10) Patent No.: US 10,891,452 B2
(45) Date of Patent: Jan. 12, 2021

(54) RADIO FREQUENCY CONTROL SYSTEM FOR PREVENTING OCCUPATIONAL HAZARDS

(71) Applicant: TISULAR SAFETY, S.L.U., Leon (ES)

(72) Inventor: Mario Alvarez Gonzalez, Leon (ES)

(73) Assignee: TISULAR SAFETY, S.L.U., Leon (ES)

( * ) Notice: Subject to any disclaimer, the term of this patent is extended or adjusted under 35 U.S.C. 154(b) by 0 days.

(21) Appl. No.: 16/068,279

(22) PCT Filed: Jan. 5, 2017

(86) PCT No.: PCT/EP2017/050197
§ 371 (c)(1),
(2) Date: Jul. 5, 2018

(87) PCT Pub. No.: WO2017/118691
PCT Pub. Date: Jul. 13, 2017

(65) Prior Publication Data
US 2019/0018990 A1 Jan. 17, 2019

(30) Foreign Application Priority Data
Jan. 5, 2016 (EP) .................................... 16382002

(51) Int. Cl.
*G06F 17/00* (2019.01)
*G06K 7/08* (2006.01)
(Continued)

(52) U.S. Cl.
CPC ..... *G06K 7/10386* (2013.01); *G06K 7/10396* (2013.01); *G06K 7/10475* (2013.01);
(Continued)

(58) Field of Classification Search
USPC ......................................... 235/451, 492, 375
See application file for complete search history.

(56) References Cited

U.S. PATENT DOCUMENTS 7,551,092 B1 * 6/2009 Henry .................. G08B 21/245
340/286.07
8,310,367 B1 * 11/2012 Vishwanath ....... G06K 19/0773
340/572.1
(Continued)

FOREIGN PATENT DOCUMENTS

WO WO 2005/045745 A1 5/2005
WO WO 2014/182701 A1 11/2014

OTHER PUBLICATIONS

International Search Report issued in Internation Patent Application No. PCT/EP2017/050197 dated Mar. 9, 2017.

*Primary Examiner* — Tuyen K Vo
(74) *Attorney, Agent, or Firm* — Arent Fox LLP

(57) ABSTRACT

The invention relates to a radio frequency based control system for preventing occupational hazards, comprising a communication network that connects one or more workers with one or more managers via the Internet or a mobile network, and one or more servers and databases connected to that communication network, further comprising: a plurality of RF tags attached to objects or tools used by workers during their work activity, said tags comprising means for data transmission through radio frequency; and one or more portable mobile terminals, configured for being equipped by workers and for receiving data transmitted by the RF tags, said mobile terminals comprising Internet connectivity and/or mobile network connectivity; and one or more management devices connected to the Internet and/or to a mobile network for receiving transmitted data by mobile terminals and/or recorded or analysed by the servers.

13 Claims, 1 Drawing Sheet

(51) Int. Cl.
*G06K 19/06* (2006.01)
*G06K 7/10* (2006.01)
*G06Q 10/08* (2012.01)
*G06Q 10/06* (2012.01)
*G06K 17/00* (2006.01)
*G06K 19/07* (2006.01)
*G06K 19/077* (2006.01)

(52) U.S. Cl.
CPC ..... *G06K 17/0029* (2013.01); *G06K 19/0702* (2013.01); *G06K 19/07758* (2013.01); *G06Q 10/06398* (2013.01); *G06Q 10/0875* (2013.01)

(56) References Cited

U.S. PATENT DOCUMENTS

| | | | | |
|---|---|---|---|---|
| 9,792,796 | B1* | 10/2017 | Lauka | G08B 21/02 |
| 2006/0178110 | A1* | 8/2006 | Nurminen | A63B 24/0021 |
| | | | | 455/41.2 |
| 2007/0247285 | A1* | 10/2007 | Rajala | G01H 1/003 |
| | | | | 340/10.1 |
| 2010/0060452 | A1* | 3/2010 | Schuster | G06Q 10/06 |
| | | | | 340/572.1 |
| 2010/0085156 | A1* | 4/2010 | Tucker | G06K 19/0717 |
| | | | | 340/10.1 |
| 2010/0265041 | A1* | 10/2010 | Almog | G06K 19/07749 |
| | | | | 340/10.1 |
| 2010/0271187 | A1* | 10/2010 | Uysal | G06K 7/0008 |
| | | | | 340/10.4 |
| 2011/0036168 | A1* | 2/2011 | Lin | G01P 15/008 |
| | | | | 73/514.05 |
| 2012/0062382 | A1* | 3/2012 | Taneff | G08B 21/245 |
| | | | | 340/573.1 |
| 2014/0110478 | A1* | 4/2014 | Murrah | G06K 17/0029 |
| | | | | 235/385 |
| 2015/0027808 | A1* | 1/2015 | Baillargeon | B66F 17/006 |
| | | | | 182/3 |
| 2015/0318015 | A1* | 11/2015 | Bose | A63F 13/212 |
| | | | | 386/248 |
| 2016/0232758 | A1* | 8/2016 | Fletcher | G08B 3/10 |
| 2016/0292881 | A1* | 10/2016 | Bose | G06K 9/00711 |
| 2016/0300470 | A1* | 10/2016 | Logan | G07C 9/00571 |
| 2017/0245806 | A1* | 8/2017 | Elhawary | G06F 19/3481 |

* cited by examiner

RADIO FREQUENCY CONTROL SYSTEM FOR PREVENTING OCCUPATIONAL HAZARDS

CROSS-REFERENCE TO RELATED APPLICATION

This application is a 35 U.S.C. 371 National Phase of PCT Application No. PCT/EP2017/050197 filed Jan. 5, 2017 which claims priority to EP Application No. 16382002.0 filed Jan. 5, 2016. The disclosure of these prior applications are hereby incorporated by reference herein.

FIELD OF THE INVENTION

The present invention relates to a system for online monitoring of the use of safety means by workers when they perform activities that require the use of protective equipment, so that the risks associated with those activities and the rate of human error in the application of work safety protocols are highly reduced. The invention can be used in any workplace and is preferably based on radio frequency communication and verification means, as well as data networks associated with mobile terminals.

BACKGROUND OF THE INVENTION

There are nowadays different applications of radio frequency communication technologies, oriented for example to logistics or textile industry for tracking shipments or identifying product lots. Among these technologies, some of the most popular rely on communication via RF ("Radio Frequency") identifiers, which comprise storage systems and remote data recovery devices called labels or beacons (which will be referred herein as "tags"). The main purpose of RF technology is to transmit the identity of an object (like a unique serial number) using radio waves.

RF tags are devices similar to stickers which can be attached or incorporated to a product. They also comprise antennas to enable them to receive and respond to requests by radio frequency from an RF transceiver. Among the different types of RF tags, passive tags do not need internal power supply, contrary to the active tags. One advantage of using radio frequency in these devices over other communication bands (e.g., infrared) is that it does not require direct sight between the transmitter and the receiver.

The use of RF technology enables the identification of any product within a supply chain or a working protocol. Regarding traceability, the tags can be recorded in real time, obtaining information about the tagged object, including its localization or its periods of use. In this way, they provide remarkable optimization capabilities for managing objects in their scope of application.

Within the sector of occupational hazard control, there are also known applications of radio frequency sensors aimed to control work activities associated with the calculation of insurance premiums. These applications relate to the use of systems comprising a processor configured to receive data from the sensors, for example sensors based on RF tags and transponders, which are located at the workplace of an insured entity or in objects, tools or machinery used by workers. The RF tags allow a better control of the actions performed by employees of the insured entity, whose associated data are processed by a business logic module. With this system, it is possible to adjust the terms of an insurance policy based on the safety data received.

Existing RF systems still need, however, antennas that cover the entire area of the workplace where they are used, or fixed antennas on archways reading the tags within a detection range. If the tags are read-active, i.e. they generate a signal which is received by the antennas arranged at the workplace, the reading distance is substantially greater. If, on the opposite, the tags are passive, the distance at which the antenna should be located to detect a tag is substantially reduced. This happens, for example, with personal RF cards used for identifying persons and allowing their access to restricted areas. They can be carried in a card holder without generating any signal, and require to be at a distance of a few centimetres from the antenna in the corresponding access control in order to be detected.

In this context, although the known systems currently provide different technologies valid for the identification of objects through radio frequency communication, they do not provide yet a flexible solution that can be adapted to each worker independently, while allowing a general control which is not limited to a particular area of coverage (for example, the range of the RF antennas) and can be managed remotely, both for the analysis of the information related to the tasks of workers and to alert them in case of risk during the performance of their activities.

The present invention proposes a solution to this technical problem, through a new portable radio frequency control system which can be used by each worker adapting to his/her specific tasks, avoiding the use of external antennas and providing a detailed control the activities performed.

BRIEF DESCRIPTION OF THE INVENTION

An object of the present invention is to provide a communications technology that allows control of safety protocols at work, through an easy use and also providing flexibility and independence to employees during the performance of their activities, without interfering with them.

To achieve this, the invention is based on the application of RF radio frequency identification technology, by using RF tags to control the availability and use of protective equipment by workers performing activities that require its employment. As previously mentioned, in the context of the invention the word "tag" will comprise a label, a beacon or any device equipped with RF communication means.

This object of the invention is preferably achieved by a radio frequency control system for preventing occupational hazards, comprising a communication network that connects one or more workers with one or more managers, via the Internet or a mobile network, and one or more servers and databases connected to that network.

Advantageously, the system of the invention further comprises:

A plurality of RF tags associated to objects or tools used by workers during their work activity, said tags comprising means for data transmission through radio frequency.

One or more portable mobile terminals, configured for being equipped by workers and for receiving data transmitted from the RF tags, said mobile terminals comprising Internet connectivity and/or mobile network connectivity.

The invention provides a versatile system enabling greater independence and comfort by integrating all its reading functionalities in the mobile terminals being carried by the worker, while allowing continuous monitoring of the controlled elements (e.g., safety tools or clothes) by means of lightweight and portable communication means which not hinder the performance of work activities. Furthermore, these elements have preferably a small size so that they do not limit or interfere with the movement of workers, while also allowing their attachment to the tools or items which are to be monitored.

The information generated by the RF tags and obtained by the mobile terminals can be stored and transmitted to remote management devices connected to the Internet and/or a mobile network, so that the associated data can be uploaded either synchronously (when there is network coverage) or asynchronously (by temporarily storing the data from the mobile terminal, until there is the necessary coverage for its upload to the servers). This provides integrity to the collected data at any given working activity. The information transmitted to the servers can also comprise data generated by the mobile terminals such as, for instance, geolocation, time stamp, or connectivity data.

In a preferred embodiment of the invention, the means for data transmission between the RF tags and the mobile terminals comprise RFID or Bluetooth communication technologies. This enables the use of standard protocols with low energy consumption, allowing longer periods of activity without the need of charging the batteries of the system elements.

In another preferred embodiment of the invention, the operating band for reading the RF tags is between 800-1000 MHz when using RFID communication protocols. This achieves a standard use in a suitable UHF band suitable for data transmission both for RF devices and mobile communications. Also, when using Bluetooth communication protocol, the RF operating band is between 2400-2483.5 MHz and, more preferably, between 2402-2480 MHz.

In another preferred embodiment of the invention, the mobile terminals are mobile phones. This adds all the functionalities of smartphone technologies to the tag identification functionalities of the system, such as connection and broadcasting of audio and video content, messaging, GPS location, Internet connection, etc.

In another preferred embodiment of the invention, the RF tags comprise long-lasting (i.e. with service life of at least one year) or rechargeable batteries. This achieves autonomous and prolonged use, allowing the adaptation of the system elements to the specific workplace, as batteries can be loaded when needed without affecting the activities of workers.

In another preferred embodiment of the invention, the RF tags comprise means for insulation or protection from humidity and/or temperature. This allows the tags, through the currently known insulation technologies, to work optimally between −30° C. and 70° C., within an effective range of relative humidity comprised between 5% and 90%. Those means of insulation or protection can adopt several forms depending on the activities, tools or items which are to be monitored within the system. For example, the tags can be equipped with anti-shock or anti-dust protection means, so that they can be used under unfavourable environmental conditions. The RF tags can also comprise different attachment means to the monitored items, depending on their specific functionalities. More preferably, each RF tag can be unambiguously associated to an item by means of a unique data identifier.

In another preferred embodiment of the invention, the system comprises one or more management devices connected to the Internet and/or a mobile network for receiving data transmitted by the mobile terminals and/or data recorded or analysed by the server. More preferably, said management devices include computers, tablets and/or phones. This allows the work safety data obtained by the system to be displayed on a wide range of formats, both for static and dynamic use.

In another preferred embodiment of the invention, the mobile terminals comprise means for transmitting geolocation information to the server, via the Internet or through a mobile network. This additionally allows tracing the workers' activities also with spatial and temporal reference, providing a more complete view of their work and/or its associated risks.

In another preferred embodiment of the invention, the mobile terminals and/or the server is configured with one or more software applications configured to generate management data reports associated to RF tags, or for generating safety alarms to managers or workers using the system. This allows the system to show the information related to work activities in an accessible and intuitive way, easily identifying any risk or imminent danger in real time.

In another preferred embodiment of the invention, the RF tags comprise reinforcing means against degradation produced by the use or maintenance of equipment or tools used by workers during their labour activity. Thus, the durability of the system is highly improved, allowing prolonged uses even for monitoring elements subject to high wearing conditions.

In yet another preferred embodiment of the invention, the RF tags comprise one or more accelerometers configured for generating data associated to the workers' activities when carrying the RF tags. These accelerometers allow controlling the specific activities carried out by the workers and analysing the specific movements associated thereto. This functionality provides a deeper understanding of the monitored activities, allowing the managers to determine if the use of the equipment has been made correctly or not in the context of the performed works. This is achieved by analysing the obtained data through the management devices connected to the Internet and/or a mobile network, wherein the analysis is preferably carried out synchronously (when there is network coverage) or asynchronously (by temporarily storing the data from the mobile terminal, until there is the necessary coverage for its upload to the server). As mentioned before, this provides integrity to the collected data from the RF tags and the accelerometers at any given working activity or condition.

In yet another preferred embodiment of the invention, the system comprises one or more portable RF readers configured for being equipped by workers and for reading and recording data associated to the RF tags, said RF readers comprising means for data transmission through radio frequency. In this embodiment, the RF readers act as communication intermediaries between the RF tags and the mobile terminals. Portable RF readers of similar size and weight to a mobile phone can be fixed, for example, to the belt of the worker without needing any further interaction during activities, thus facilitating the concentration of the worker on the task that is being developed.

In yet another preferred embodiment of the invention, the RF tags comprise RFID tags or Bluetooth tags. These protocol technologies can be easily integrated in standard communication protocols of most mobile terminals.

The proposed system is therefore applicable to any protection equipment of the market suitable for being equipped with an RF tags. For example, the equipment may comprise a helmet, gloves, safety shoes, work clothes, anti-fall equipment protection, respiratory protection, etc. However, the present invention is also applicable to signals, allocation and construction equipment to be used prior to the beginning of working activities.

The system of the invention is applicable to any industrial sector and can also be applied in other technical fields such as medical, logistics, food, emergency, etc.

Additionally, the system of the invention provides high mobility to the workers, since the reading of the RF tags is performed at the required distance, regardless of the geographic location where the activity is being performed, and regardless of the movements made by each operator in the monitored area, not being necessary to have archways or fixed antennas at the workplace.

The present invention allows, also, online monitoring during activity so that authorized people are able to perform, monitor and control the provision and use of protective equipment for workers. During the development of the activity, it also allows monitoring the time spent on each assigned task, the geographical position where a worker is developing activities, as well the compliance with time breaks associated to the working procedures in each case. This monitoring can be carried out both in closed environments and outdoor environments, being also possible to record the geographical position through the mobile network when the detected GPS satellites are not in favourable locations.

The invention makes it possible to generate reports for each activity or worker, defining different ratios or indicators according to the needs of each operator or manager and the activities related to their specific activities.

The information contained in each RF tag and the unambiguous code that relates it with protective equipment, provides the manager, the safety officer or the employer the capability of monitoring the durability condition of the equipment and managing its eventual replacement according to the law, also complying with legal aspects related to the activities carried out.

In case of an accident or incident, the data collected by the system of the invention facilitates the investigation of the events, providing a preventive tool that adds value when defining preventive actions, operating instructions or procedures to be applied.

Summing up, the invention provides greater control for the operator or responsible of the activity, facilitating compliance with occupational safety and health regulations which are legally enforceable regarding the use and maintenance of protective equipment for workers, as well as regarding the optimization of time spent on each activity per worker.

DETAILED DESCRIPTION OF THE INVENTION

Figure 1:
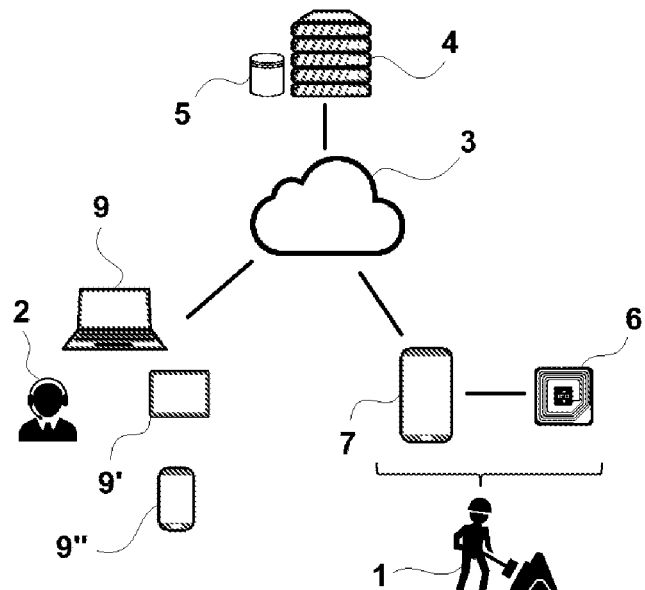
FIG. 1 shows an overview of the radio frequency control system for preventing occupational hazards of the invention according to a first preferred embodiment thereof, wherein its main elements are depicted.
Figure 2:
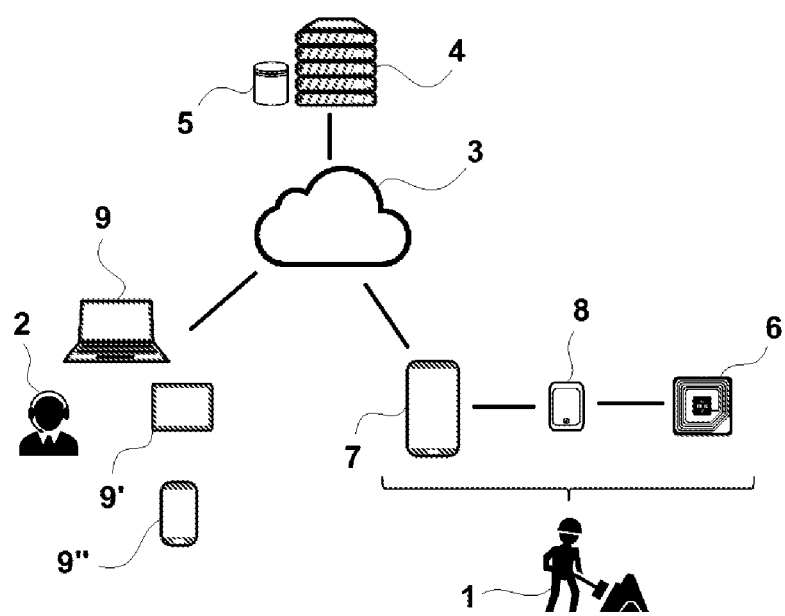
FIG. 2 shows an overview of the radio frequency control system for preventing occupational hazards of the invention according to a second preferred embodiment thereof, wherein its main elements are depicted.

A detailed description of the system of the invention is hereby presented, referring to a preferred embodiment based on FIGS. 1 and 2 of the present document. The embodiment is provided for illustrative purposes, but without intending a limitation over the claimed invention.

As described in the preceding paragraphs, the system of the invention is based on a plurality of elements that make up a communication network that connects workers (1) belonging to a given workplace, with one or more managers (2) via the Internet or a mobile network (3) and one or more servers (4) and databases (5). Through this communication network, it is possible to record information concerning the uses and/or work activities by employees (1), and analyse it to determine if such activities or uses are being performed correctly, for example following a proper safety protocol, wearing a required safety gear, using the correct tools according to a given regulation, or performing the established time breaks related to a work activity.

Through the analysis of the activities performed by workers (1), it is possible to provide one or more managers (2) (for example, the safety officer of an industrial department, or an employer) with a tool that ensures the enforcement of the provision and use of protective equipment by workers (1) during work activities, while also facilitating the control and optimization of the time spent on each activity per worker (1).

To generate and record information on the activities developed by workers (1), the system of the invention is mainly based on radio frequency data transmission, preferably via RF tags (6) associated to the objects whose use is to be controlled or analysed. Such RF tags (6) can be installed, for example, in a particular tool or working machine, or in a particular worker safety garment (1) such as a helmet, reflective vest, etc. Thus, each necessary element in the working protocol to be controlled is uniquely identified by its corresponding RF tag (6).

RF tags (6) thus comprise different characteristics depending on the equipment to which they are associated, and are preferably protected from degradation or daily use, for example against high-temperature washing conditions, if we refer to work clothes, and can be reduced in size or encapsulated if we refer to safety footwear. Today there are many different models of RF tags (6), with very different characteristics in terms of encapsulation, reading properties, products used to fix them on materials, etc. The RF tags (6) can be also equipped with long-lasting or rechargeable batteries.

To identify each of the RF tags (6), each worker (1) shall be equipped with a mobile terminal (7) as data receiving element (for example a phone or tablet with wireless connectivity to one or more mobile data networks), configured with a communication technology compatible with the RF tag (6) (for example, Bluetooth or RFID connectivity). Thus, the RF tag (6) maintains communication with the mobile terminal (7) carried by each operator, channelling the information associated with the work activities through a software application installed in said terminal (7), which is managed by the remote manager (2) of the obtained data. The application will store the data collected by the mobile terminals (7) (for example, geographical location information associated with or nearby wireless networks). Such information may be sent from the mobile terminals (7) to the server (4) system, through the Internet or a mobile network (3), both synchronously or asynchronously. Thus, when there is no phone or Internet coverage available, the relevant information can still be stored in the mobile terminal (7) and sent to the server (4) of the application when such coverage is restored. This also adds an element to the system of the invention that reinforces the integrity and quality of the data analysed.

In another preferred embodiment of the invention, the RF tags (6) comprise one or more accelerometers configured for generating data associated to the workers' (1) activities. The accelerometers allow controlling the specific actions carried out by the workers (1) and analysing the specific movements associated thereto. This functionality provides a deeper understanding of the monitored activities, allowing the managers (2) to determine if the use of the equipment has been made correctly or not by the workers (1) in the context of the performed tasks.

In a second preferred embodiment of the invention shown in FIG. 2, the system can also comprise a portable RF reader (8), of a reduced weight and size so that it does not affect the work activity. This RF reader (8) has a long-lasting or rechargeable battery and works preferably in the range of about 800-1000 MHz, meeting the standards ISO 18000-6C and EPC Class1 Gen 2. To facilitate its use in a variety of work environments, the RF reader (8) and/or the RF tags (6) comprise reinforcing or insulating means against changes in temperature and/or humidity, enabling to work optimally in a range of temperature between −30° C. and 70° C. and a relative humidity range between 5% and 90%. The RF reader (8) preferably comprises wireless radio frequency data transmission capacity, preferably using standard Bluetooth technology.

The invention provides thus constant control in risk prevention related to protective equipment used by workers in their activities. Portable RF readers (8) of similar size and weight to a mobile phone can be fixed, for example, to the belt of the worker without needing any further interaction during activities, thus facilitating the concentration of the worker on the task that is being developed.

Data transmitted by the mobile terminal (7) through the software application will be registered in the database (5) and processed by the server (4) generating activity reports for each worker (1) so that, for example, a manager (2) can monitor the work done and in progress, the geographic location at the time of development of each activity, the start time, stop time and time periods spent on each activity, the identity of a specific RF tag (6) recorded or read, the presence or absence of protective equipment in a given activity, etc. Such reports can be electronically exported in the form of spreadsheets, graphics, multimedia information, etc., and sent to one or more managers (2) of the system through the Internet or a mobile network (3) by means of one or more management devices (9, 9', 9") being, for example, a computer (9), a tablet (9') or a telephone (9").

The system of the invention provides an effective means for monitoring safety protocols at work which is easy to use, since it only requires the application of RF tags (6) to those objects or tools whose use needs to be monitored. The present technology also allows great flexibility for the replacement or substitution of RF tags (6) if needed, without affecting other elements of the system.

Moreover, the proposed system allows the transmission of information on the use of objects or tools in an efficient and comfortable way, since both the RF reader (8) and the mobile terminal (7) are portable and light-weight devices (typically between 100 and 180 g). Thus, it ensures that these elements do not interfere with the work activities performed by workers (1), providing greater comfort than that offered by other known technical alternatives.

As described in the preceding paragraphs, the system of the invention has thus the following main applications: management of workers and their personal protective equipment and tools, collective protection equipment management, organizational management, creation of work orders, transmission of work orders to workers, reporting on the results of work orders as well as continuous monitoring of the time spent and the location of workers and activities during its implementation.

The invention claimed is:

1. A radio frequency (RF) based control system for control of safety protocols at work and for investigation of events in case of an accident caused to one or more workers, the system comprising:
   a communication network communicatively coupled with the one or more workers with one or more managers via the Internet or a mobile network;
   one or more servers and databases communicatively coupled with the communication network;
   a plurality of RF tags attached to objects or tools used by the one or more workers during work activity of the one or more workers, the plurality of RF tags comprising means for data transmission through RF;
   one or more portable mobile terminals configured for being equipped by the one or more workers and for receiving data transmitted by one or more of the plurality of RF tags, the one or more portable mobile terminals being communicatively coupled with the communication network;
   one or more management devices communicatively coupled with the communication network for receiving transmitted data by the one or more portable mobile terminals or recorded or analyzed by the one or more servers and databases, the one or more management devices configured to analyze the transmitted data and output one or more reports indicating use of the objects and tools according to one or more regulations,
   wherein the plurality of RF tags have one or more accelerometers embedded therein, the one or more accelerometers being configured to generate data associated with the work activity, the objects or the tools used by the one or more workers, and specific movements associated with the one or more workers and the objects or the tools, so that the work activity is monitored.

2. The system according to claim 1, further comprising:
   one or more portable RF readers configured for being equipped by the one or more workers and for reading and recording data associated to the plurality of RF tags, the one or more portable RF readers comprising means for data transmission through RF to the plurality of RF tags and to the one or more portable mobile terminals.

3. The system according to claim 2, wherein the plurality of RF tags or the one or more portable RF readers comprise means of insulation or protection from humidity, temperature, shock or dust.

4. The system according to claim 1, wherein the means for data transmission between the plurality of RF tags and the one or more portable mobile terminals comprises Bluetooth or RFID communication technology.

5. The system according to claim 1, wherein a frequency band of operation for reading the plurality of RF tags is between 800-1000 MHz, between 2400-2483.5 MHZ or between 2402-2480 MHZ.

6. The system according to claim 1, wherein the one or more portable mobile terminals are mobile phones.

7. The system according to claim 1, wherein the plurality of RF tags comprise long-lasting or rechargeable batteries.

8. The system according to claim 1, wherein the one or more management devices comprise computers, tablets or mobile phones.

9. The system according to claim 1, wherein the one or more portable mobile terminals comprise a medium for transmitting geolocation information to sewers through the Internet or through the mobile network.

10. The system according to claim 1, wherein the one or more portable mobile terminals or the one or more servers and databases are configured with one or more software applications for generating management data reports associated with the plurality of RF tags, or for generating safety alarms to managers or the one or more workers.

11. The system according to claim 1, wherein the one or more portable mobile terminals comprise means for transmitting the data generated by the plurality of RF tags or by the one or more portable mobile terminals either synchronously or asynchronously to the one or more servers and databases.

12. The system according to claim 1, wherein the plurality of RF tags comprise reinforcing means against degradation produced by use or maintenance of equipment, the objects, or the tools used by the one or more workers during the work activity.

13. The system according to claim 1, wherein the plurality of RF tags comprising one or more encapsulation characteristics corresponding to the objects or tools to which each is attached.

* * * * *